United States Patent

[11] 3,599,805

[72] Inventors Harvey J. Spencer;
 Ernst Daniel Nystrand, both of Green Bay, Wis.
[21] Appl. No. 829,873
[22] Filed June 3, 1969
[45] Patented Aug. 17, 1971
[73] Assignee Paper Converting Machine Company, Inc.
 Green Bay, Wis.

[54] UNIT-HANDLING APPARATUS
 2 Claims, 12 Drawing Figs.
[52] U.S. Cl. .................................................... 214/6 H, 271/88
[51] Int. Cl. ..................................................... B65g 57/00
[50] Field of Search .......................................... 271/69, 84, 68, 89, 82, 59; 214/6 H, 6 S

[56] References Cited
UNITED STATES PATENTS

| 3,141,667 | 7/1964 | Novich | 271/71 X |
| 3,254,889 | 6/1966 | Nystrand | 271/69 |
| 3,298,683 | 1/1967 | Stroud | 271/59 |

*Primary Examiner*—Evon C. Blunk
*Assistant Examiner*—Douglas D. Watts
*Attorney*—Dawson, Tilton, Fallon & Lungmus ABSTRACT: Unit-handling apparatus for "unit sets" which are multiple-web packets useful in computer technology wherein separator fingers, elevator fingers and pushers all cooperate in assembling the unit sets into precise stacks both dimensionally and as to number.

INVENTORS:
HARVEY J. SPENCER
ERNEST DANIEL NYSTRAND
BY: Dawson, Tilton, Fallon & Lungmus
ATT'YS

INVENTORS:
HARVEY J. SPENCER
ERNEST DANIEL NYSTRAND

BY: Dawson, Tilton, Falloy & Lungmus
ATT'YS

UNIT-HANDLING APPARATUS

BACKGROUND AND SUMMARY OF INVENTION

This invention is an improvement on E. D. Nystrand U.S. Pat. No. 3,254,889 wherein web segments such as paper towels were accumulated into stacks for subsequent handling.

The instant invention has to do with "unit sets" which are employed for introducing data to computers. A unit set may include a plurality of paper sheets united along one edge with interleaving carbons. Desirably, these are provided the ultimate user in precise stacks, both as to shape and number. In many instances, the unit sets are consecutively numbered. In the past, there has been a problem in providing the unit sets in "square" stacks, i.e., characterized by being "shingled." This problem has been solved in a high-speed, reliable machine according to the invention.

DETAILED DESCRIPTION

The invention is described in conjunction with an illustrative embodiment in the accompanying drawing, in which FIG. 1 is a perspective view of a machine for producing unit sets and which incorporates the inventive features adjacent the leaving end, i.e., the left-hand portion of the showing in FIG. 1;

In the above-mentioned Nystrand U.S. Pat. No. 3,254,889, two sets of fingers were employed for movement in the stack development path. One set of fingers reciprocated while the other set orbited. The orbiting set entered the path to define the end of a previous stack and to temporarily support the thereafter accumulated web elements while the reciprocating fingers delivered the completed stack to an output conveyor. The principles of the Nystrand invention are employed herein but with certain advantageous modifications.

Figure 1:
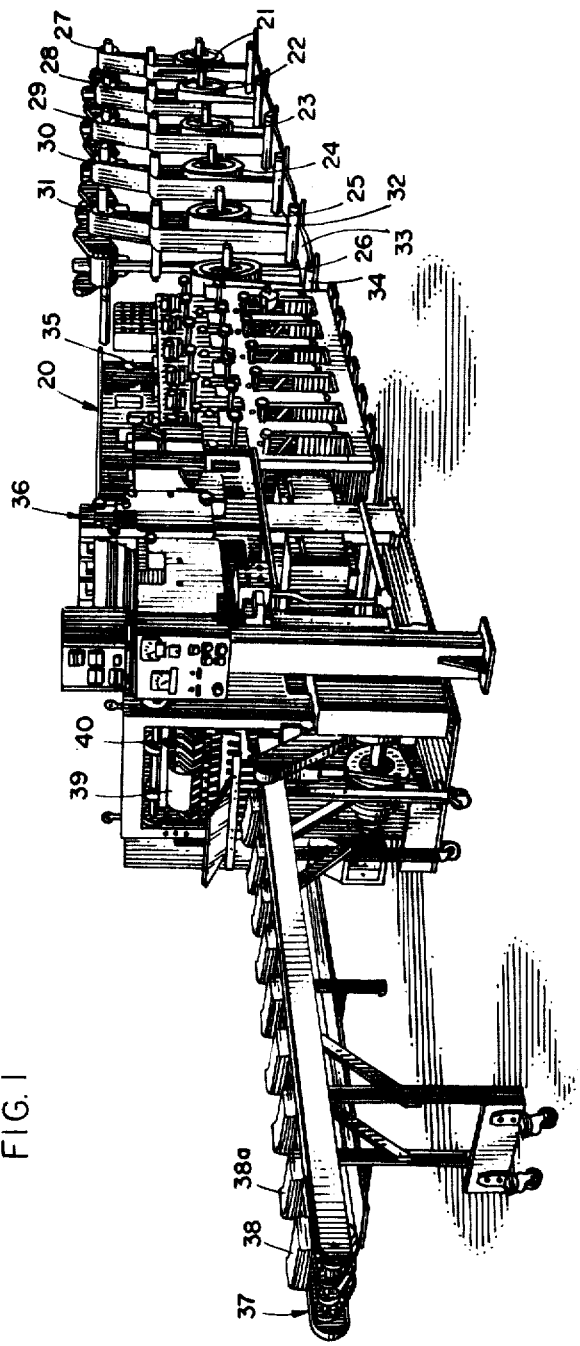

A machine embodying the instant invention is seen in FIG. 1 and is designated generally by the numeral 20. At the extreme right-hand portion of FIG. 1, the machine is equipped with a plurality of rolls of paper such as are designated 21, 22, 23, 24, 25, and 26. These are mounted on conventional unwind stands and also provided are a plurality of rolls of carbon paper as at 27, 28, 29, 30, and 31. Thus, there are provided top and bottom sheets from the rolls 26 and 21, with the carbon sheets from the rolls 27–31 being interleaved. For example, the next to the top sheet is provided from the roll 25 which proceeds downwardly and under a frame roller 32 while the carbon thereabove is taken from the roll 31, also passing under the roller 32 to provide the web 22. The topmost sheet is provided by the roll 26 which passes under the frame roller 34. The multi-ply web thus achieved from the rolls 21–31 then proceeds through the printing section 35, is subsequently "unitized," transversely severed, and numbered in the section generally designated 36 and ultimately issues from the left-hand portion of the machine. At the extreme left-hand portion of the machine, a conveyor generally designated 37 is seen in the process of supporting a plurality of stacks of unit sets as at 38. Each stack 38 may contain 50 unit sets. Each set, in the illustration given is made up of 11 plies—six white sheets with five interleaving carbons. The numeral 39 designates a unit set in the process of issuing from the manufacturing portion of the machine and is in the further process of being inverted, i.e., flipped over. This is achieved through a gripping mechanism which is particularly advantageous for producing consecutively numbered sets. A unit set is given a number on its topmost sheet and a given run may include 10,000 unit sets. By flipping each unit set over as it issues from the machine, each stack will have at its bottom the lowest numbered unit set. Hence, the unit sets in stack 38 will be numbered on their bottom-facing side from 1 to 50 in proceeding from the bottom to the top and the stack 38a similarly arranged but numbered, for example, from 51 to 100. Thus, by inverting the stack 38, the lowest numbered unit set is positioned uppermost and aggregated stacks can be provided wherein the unit sets are consecutively numbered. Were it not for the inverting step provided at 39, it would be necessary to number the unit sets in reverse fashion which presents substantial operating difficulties.

Figure 2:
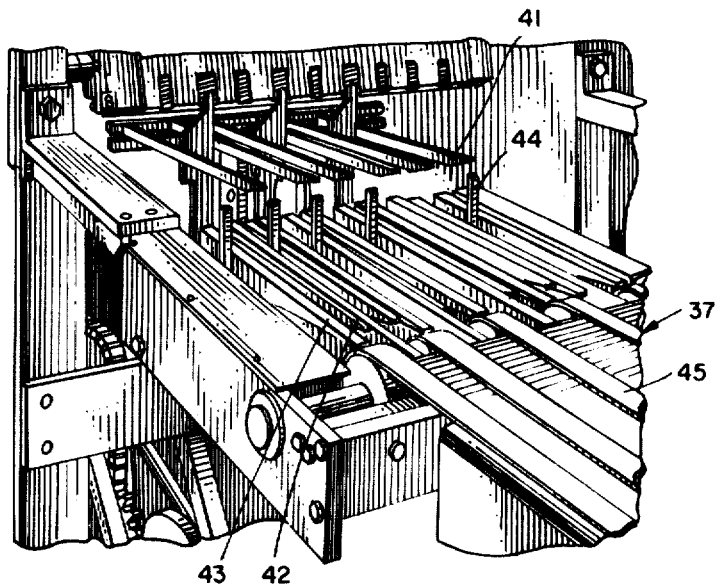
FIG. 2 is a fragmentary perspective view of the stacking mechanism of the machine of FIG. 1.

As a particular unit set is inverted as at 39 by the gripping mechanism generally designated 40 in FIG. 1, the same is introduced into the stacking mechanism, a portion of which can be seen in perspective in FIG. 2. If the particular unit set 39 is the first of the given stack, it is deposited on a plurality of separator fingers 41. These fingers 41 are employed to separate one stack from another and can be characterized as "diving" into the flow of unit sets delivered by the gripping mechanism so as to separate one stack from another. As the stack begins to build on the separator fingers 41, the fingers 41 continue in an orbital path downwardly, ultimately depositing the partially completed stack on elevator fingers 42. Thereafter the separator fingers 41 retract, complete the orbit and are poised for entry into the stack assembling path after the deposited stack reaches the predetermined number.

In turn, the elevator fingers 42 proceed downwardly to deposit a completed stack on stationary table fingers 43. During this time the separator fingers are supporting a partially completed stack a sufficient distance above the completed stack to permit pusher elements 44 to move the completed stack on to the conveyor 37 which, in FIG. 2 is seen to include a plurality of tapes 45. The various movements of the fingers and pushers are achieved mechanically through linkages governed by the cam arrangement seen in FIG. 3. For ease of understanding, the components responsible for the various operations have been separated into a series of elevational views. For example, FIGS. 4, 5 and 6 each show the same camshaft 46 but with different actuated components.

Figure 4:
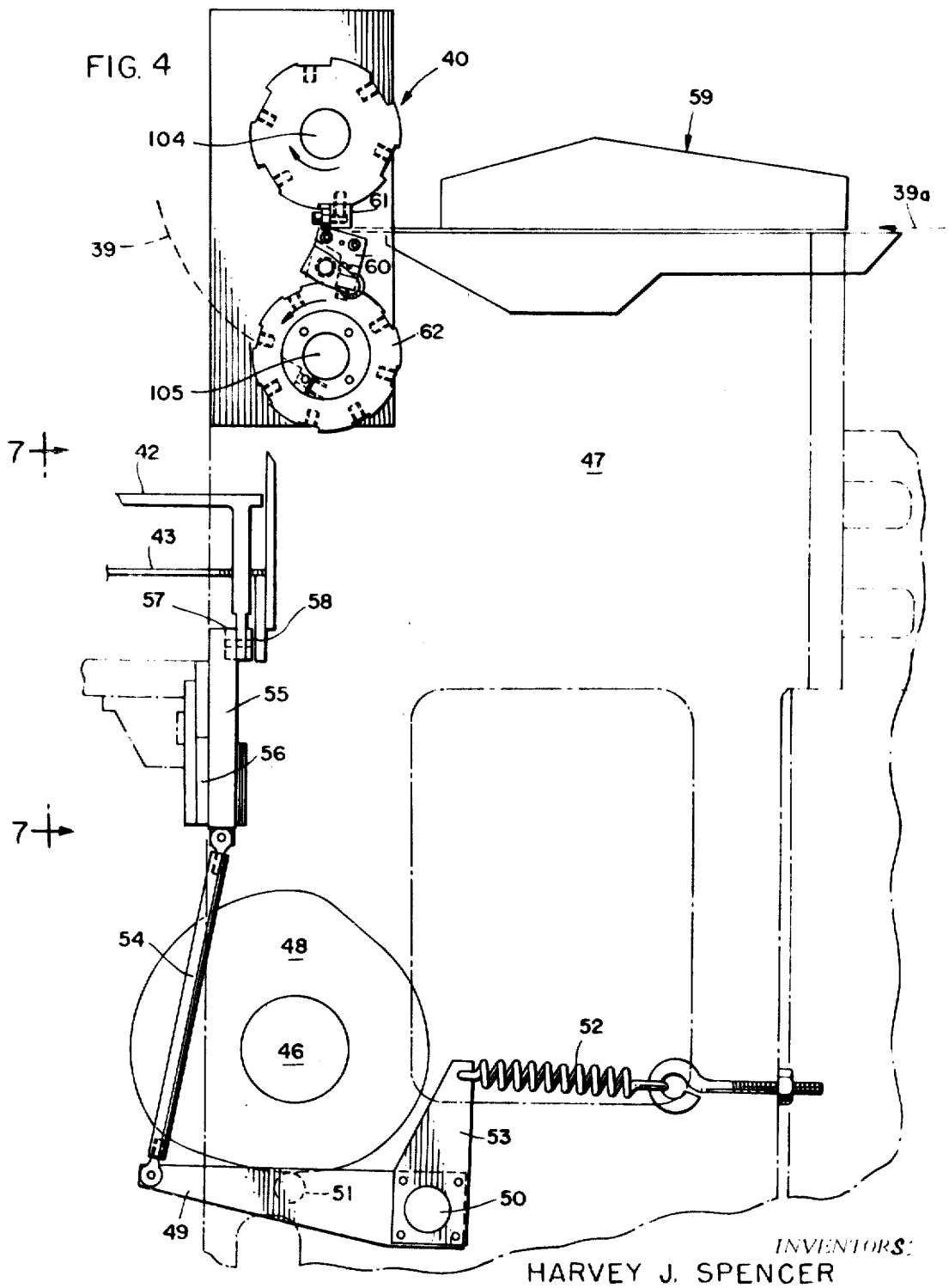
FIG. 4 is a fragmentary side elevational view of the stacking portion of the machine featuring the components which operate the elevator fingers.

Turning now to FIG. 4, it will be noted that the camshaft 46 is at the lower left-hand portion of the view and is suitably journaled in the frame 47. A cam 48 is fixed to the shaft 46 and this governs the reciprocation of the elevator fingers 42 (seen in the middle left hand portion of FIG. 4). In FIG. 4, the table fingers 43 are seen a spaced distance below the elevator fingers 42 and it will be appreciated that the lowest point of reciprocation of the elevator fingers 42 is slightly below the top of the table fingers 43. The linkage system transmitting power (dictated by the contour of cam 48) to the elevator fingers 42 is seen in the lower portion of FIG. 4. A pivot arm 49 is pivotally mounted on a shaft 50 suitably mounted in the frame 47. The pivot arm 49 is equipped with a cam follower 51 which follows the contour of the cam 48 by virtue of the biasing spring 52. The pivot arm 49 has fixed to it an arm portion 53, thereby developing an L-shaped configuration. The spring 52 extends between the arm portion 53 and the frame 47, thereby tending to rotate the L-shaped arm 49 in a clockwise direction around the pivot shaft 50. This insures that the cam follower 51 will be urged against the contour of the cam 48. It also means that the elevator fingers 42 are resiliently urged upwardly so that any extraordinary load can be accommodated by the fingers 42 dropping downwardly against the bias imparted by the spring 52.

Figure 3:
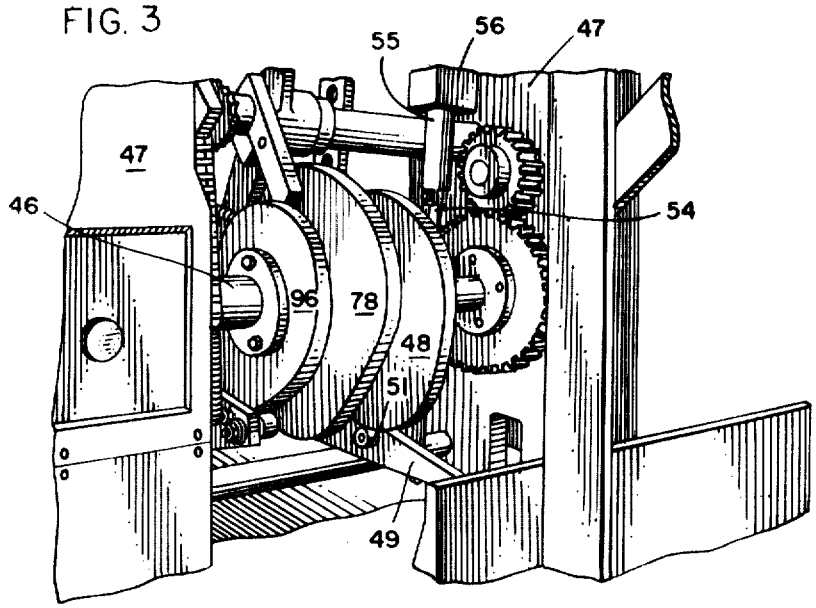
FIG. 3 is a fragmentary perspective view of certain cam actuators associated with the stacking devices of FIG. 2 and physically located therebelow in the actual machine.
Figure 7:
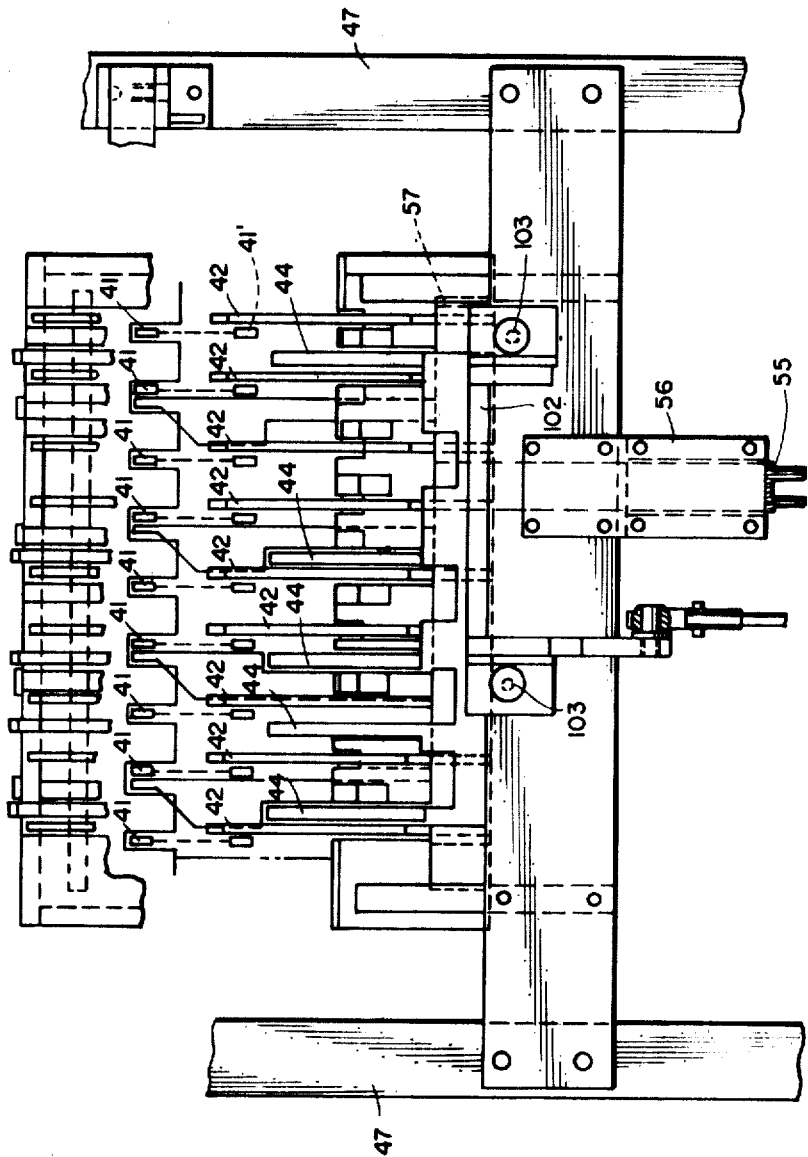
FIG. 7 is a fragmentary front elevational view as seen along the line 7–7 of FIG. 4.

Coupling the pivot arm 49 to the elevator fingers 42 is a connecting rod 54 (these elements also being seen in FIG. 3 at the right-hand portion thereof). The connecting rod 54 in turn is pivotally coupled to a round shaft 55 which slides in a fixed block 56 attached to the frame 47. Suitable brackets are provided for this purpose and at the upper end the round shaft 55 is coupled by means of a block 57 and clamp 58 to the plurality of elevator fingers 42. The illustrative machine is equipped with 9 elevator fingers 42 as can be appreciated from a consideration of FIG. 7. In FIG. 7, the block 57 is seen to extend over a substantial portion of the width of the machine so as to support the various fingers 42 at horizontally spaced apart points.

The upper portion of FIG. 4 illustrates the gripper mechanism 40 which is arranged to receive successive unit sets as illustrated schematically by the numeral 39a at the extreme upper right-hand portion of FIG. 4. Just prior to entering the apparatus portion seen in FIG. 4, the unit sets are developed by passing through a suitable cutoff roll arrangement and are advanced by means of a conveyor generally designated 59 to afford a discrete separation between successive unit sets. Thereafter, the leading edge of each unit set enters a gripper 60 under the influence of a tucker 61, and as the gripper-carrying roll 62 rotates, the particular unit set is caused to flip over as is designated schematically by the numeral 39 in FIG. 4.

Figure 5:
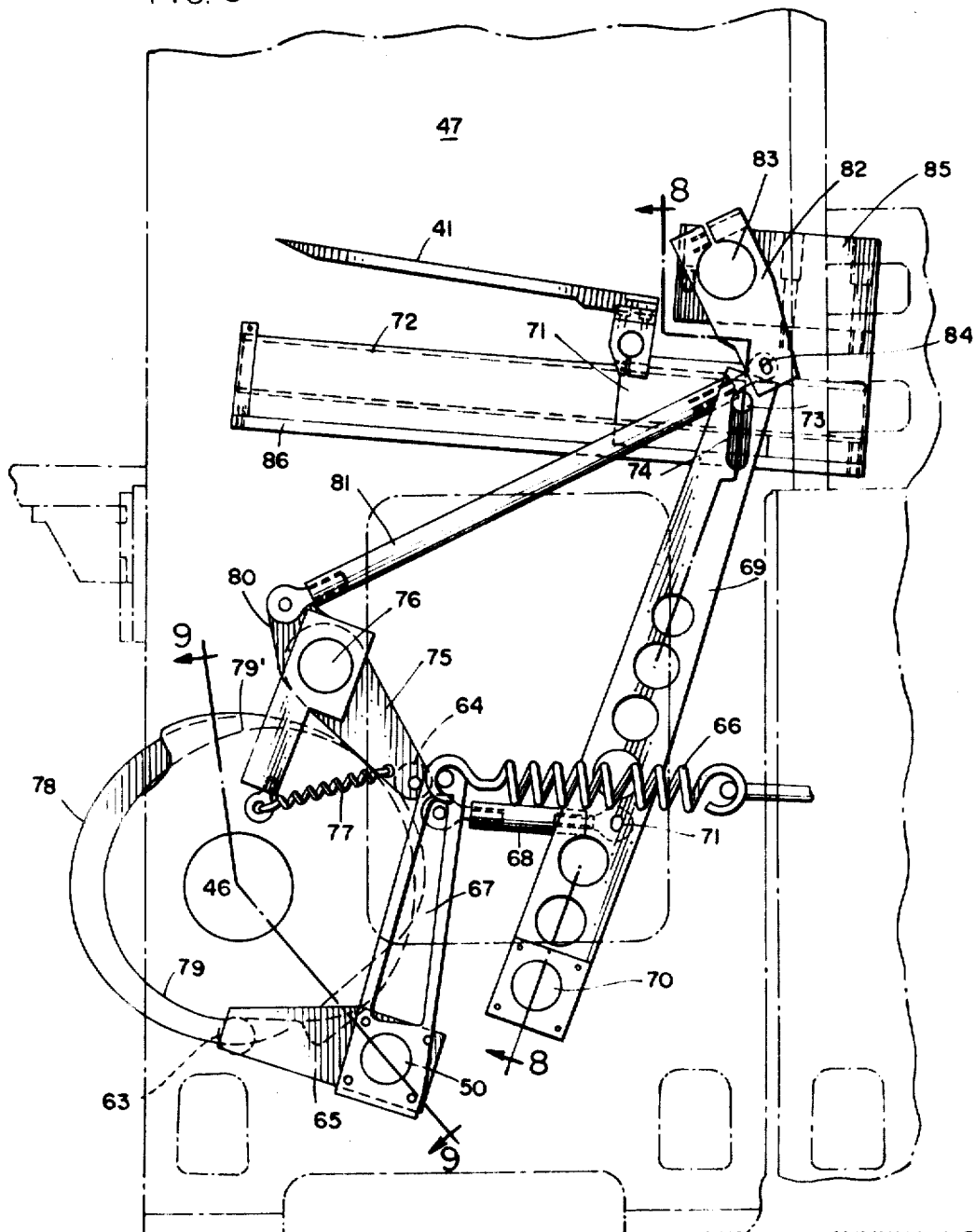
FIG. 5 is a view similar to FIG. 4, being a side elevational view of the stacking portion of the machine, but which features the components related to the separator fingers.

As a stack is completed on the elevator fingers 42, the invention provides for the insertion of the separator fingers 41 into the stacking path. The mechanism responsible for this is seen in FIG. 5 which, it will be appreciated, represents essentially a different vertical longitudinal section of the machine—as compared to FIG. 4. The element arrangement in FIG. 5 is somewhat more complicated than that in FIG. 4 because the separator fingers 41 require 2° of movement as contrasted to the simple reciprocation characteristic of the elevator fingers of FIG. 4. For this purpose, two cam followers are required as at 63 and 64 in the lower left-hand portion of FIG. 5. The cam follower 63 is responsible for the "in and out" movement of the separator fingers 41. The cam follower 63 is mounted on a generally L-shaped arm 65 which is pivotally mounted relative to the frame 47 by means of the cross-shaft 50. At its upper end, the L-shaped arm 65 is urged in a clockwise fashion about the pivot shaft 50 by means of a spring 66, connected at one end to the frame 47. The other end of the spring 66 is coupled to the upwardly extending portion 67 of the L-shaped arm 65. Also coupled to the upwardly extending portion 67 is a connecting rod 68. The connecting rod 68 in turn is coupled to a pair of arms 69 mounted pivotally relative to the frame by means of a cross-shaft 70. For example, the cross-shaft 70 can be seen in FIG. 8, as can the arms 69. The connection between the connecting rod 68 and the arms 69 is adjustable by virtue of an elongated slot 71 provided in the arms 69—this making possible control of the length of movement "in and out" of the separator fingers 41.

Figure 8:
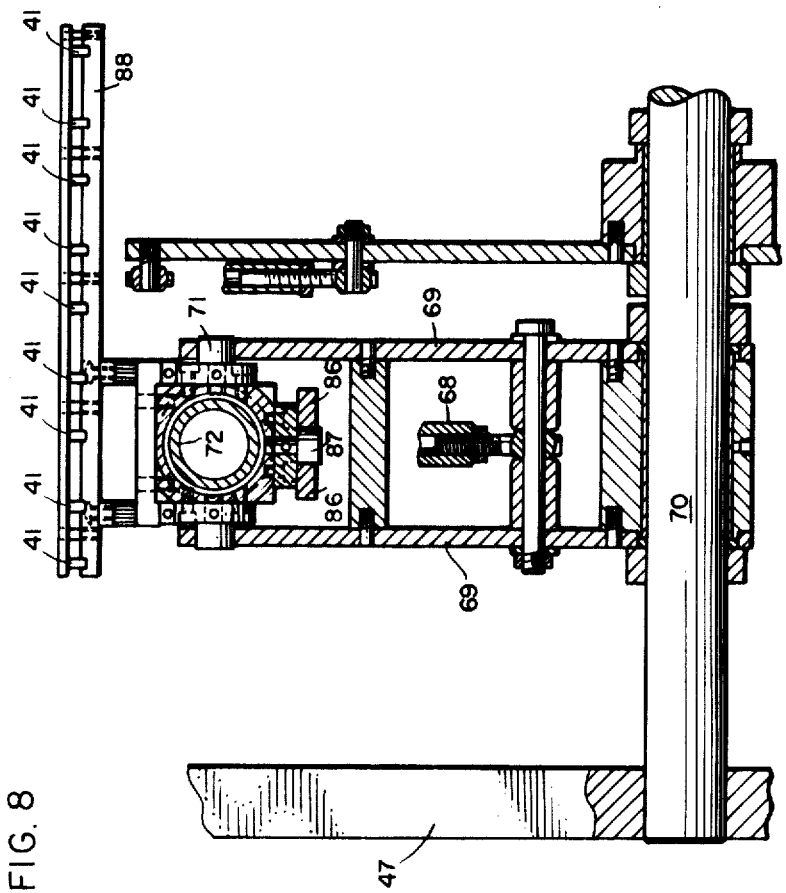
FIG. 8 is a fragmentary sectional view taken along the line 8–8 of FIG. 5.

At their upper ends, the arms 69 are connected to a block 71 which is slidably mounted on a tube 72 (see also FIG. 8). The fingers 41 are seen in FIG. 5 to be attached to the block 71 so as the block 71 moves along the tube 72 (under the arcuate movement of the arm 69), the separator fingers move in and out. More particularly, the block 71 is equipped with rollers 73 which are received within elongated slots 74 provided in the arms 69.

To obtain the "up and down" movement of the separator fingers 41, the cam follower 64 is employed. It is mounted on an L-shaped rocker arm 75 (see the central portion of FIG. 5) which is pivotally mounted relative to the frame by means of a pivot shaft 76. A spring 77 is interposed between the frame and the rocker arm 75 to urge the rocker arm clockwise about the pivot shaft 76 and to maintain the cam follower 64 against the contour of the cam 78. The in and out movement of the separator fingers 41 is achieved through the cam follower 63 (see FIGS. 5 and 9) following the contour of the cams 79 and 79'. The cams 79 and 79' are shrouded by the frame 47 in FIG. 3. The positions of the cams 48, 78, and 96 are depicted schematically on FIG. 9. The cam 79 serves as a "lockout" cam, the function of which will be described hereinafter.

The upwardly extending portion 80 of the rocker arm 75 has pivotally connected thereto a connecting rod 81. The connecting rod 81 in turn is connected to a lever 82 pivotally mounted relative to the frame 47 by virtue of being connected to shaft 83. Again, a slot 84 is interposed in the connection between the elements 81 and 82 to afford a "fine tuning" of the movement of the separator fingers 41. The rocking action applied to the lever 82 through the connecting rod 81 is employed to move the separator fingers 41 up and down by virtue of a bracket 85 fixed both to the shaft 83 and to the tube 72. Thus, as the shaft 83 rotates under the influence of the lever 82, so also does the bracket 85, causing the tube 72 to move through essentially a vertical arc.

The elements 86 in FIGS. 5 and 8 are guide bars extending parallel to and below the tube 72, and serve to confine a guide roller 87 which is provided as part of the block 71. Thus, the block 71 is stabilized against a rotation on the tube 72. As can be seen in FIG. 8, a bar 88 is connected to the block 71 which supports the nine separator fingers 41 (also illustrated in FIG. 7). In FIG. 7, the lower extent of movement of the separator fingers 41 is designated at the right-hand side by the numeral 41'.

Figure 9:
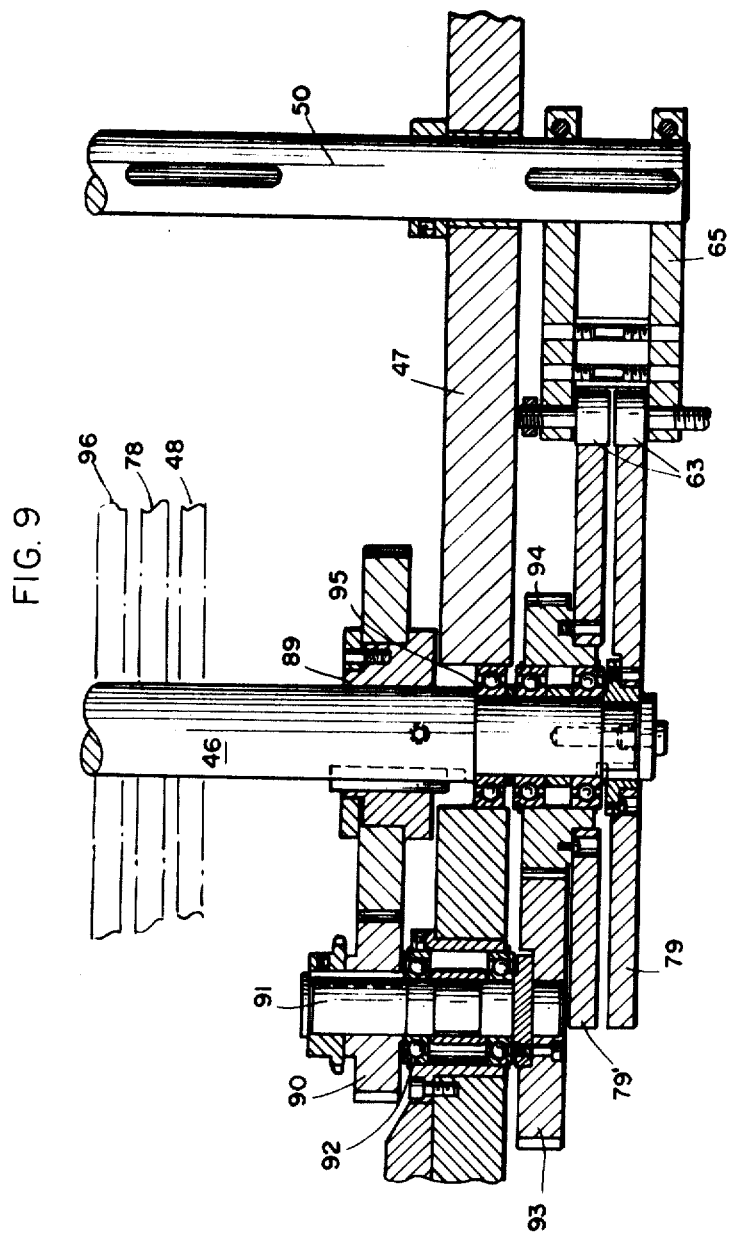
FIG. 9 is a fragmentary sectional view taken along the line 9–9 of FIG. 5.

Previously, reference was made to the lockout cam 79 (FIG. 9). In FIG. 9 it is seen that the lockout cam 79 is fixed to the camshaft 46. To obtain a multiple number of revolutions of the cam 79' for each camshaft revolution, a gear train is employed beginning with the gear 89 fixed to the shaft 46. The gear 89 engages a gear 90 carried by a shaft 91 which is journaled by means of bearings 92 within the frame 47. The same shaft 91 carries a second gear 93 which engages a gear 94 fixed to the cam 78. It will be seen that the gear 94 is journaled by means of bearings 95 on the shaft 46. The cam followers 63 ride on the periphery of both cams, and it is only when depressions in the cams 79' and 79 are in coincidence that the cam follower arm 65 is able to rock about the axis of the pivot shaft 50.

The design of the mechanism causes the cam 79' to rotate two times per pack for short forms (up to 5½ inches), and three times per pack for long forms (longer than 5½ inches). FIG. 9 shows the gear relationship and FIG. 5 the lockout cam configuration to give a two-time rotation per pack for this cam. When gears 93 and 94 are changed to a 1½ to 1 relationship and a new lockout cam is used, a three-time rotation per pack is obtained.

Figure 6:
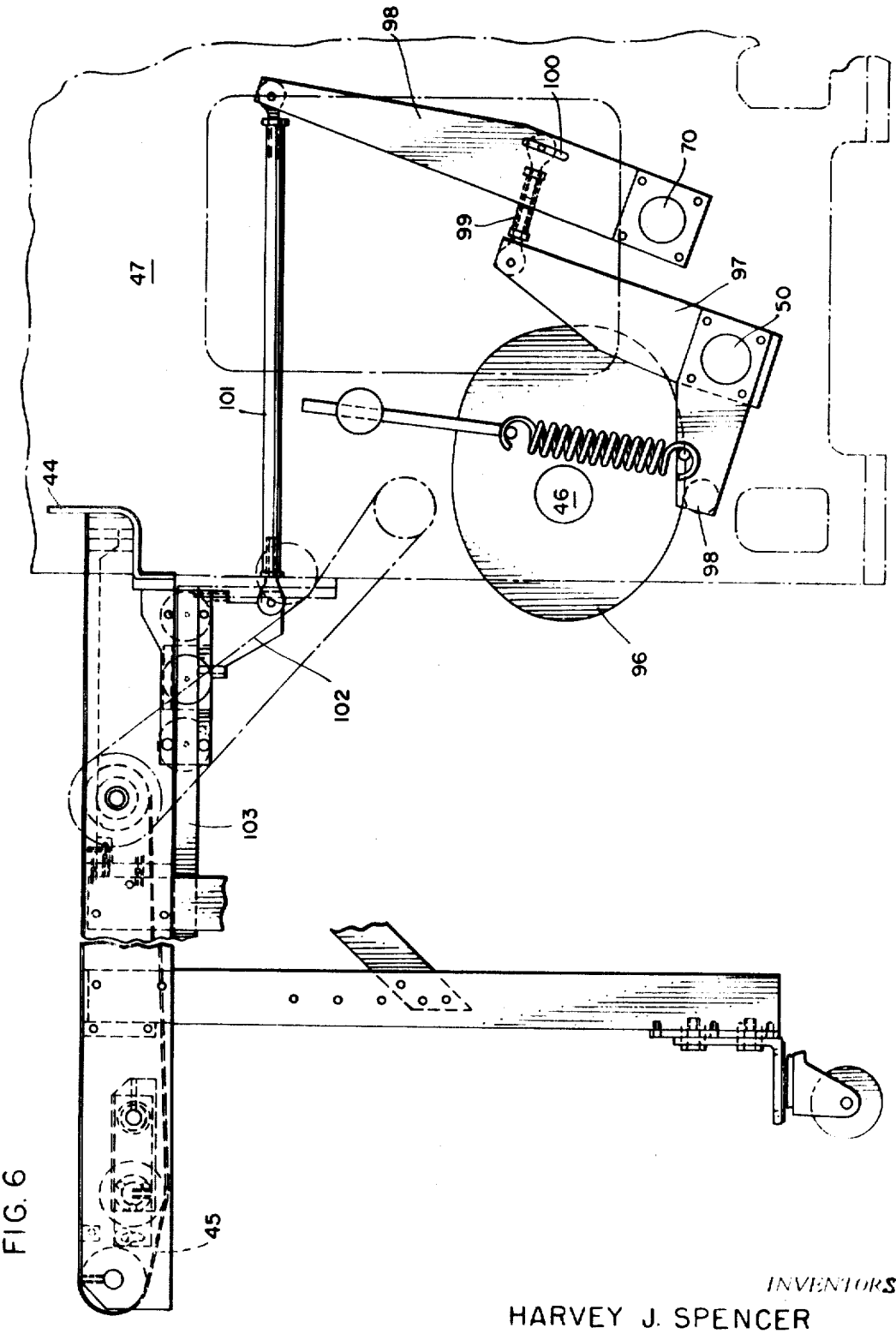
FIG. 6 is another side elevational view of the machine, essentially similar to FIGS. 4 and 5, but which features the components employed for the pushing of a completed stack from the stacking mechanism.

After a stack has been deposited on the table fingers 43 (see FIG. 2), the same is advanced horizontally onto the conveyor 37 by means of the pusher elements 44 (see FIG. 6). Again, the actuation of the pusher elements 44 proceeds from the camshaft 46 which carries a cam 96. In the lower portion of FIG. 6 it is seen that a rocker arm 97 carrying a cam follower 98 is pivotally related to the frame 47 by means of the pivot shaft 50. Connected between the upper end of the rocker 97 and an actuator arm 98, is a connecting rod 99. Again a slot 100 is provided for "fine tuning" adjustment between the connecting rod 99 and the actuator arm 98. Arcuate motion about the pivot shaft 50 is transferred to the arm 98 which in turn pivots around the axis of the pivot shaft 70. A connecting rod 101 is employed to connect the upper end of the actuator arm 98 with the pusher carriage 102 (see the upper left-hand portion of FIG. 6). The pusher carriage 102 in FIG. 7 is seen to slide on guide bars 103, the same also being seen in the upper left-hand portion of FIG. 6. The pusher carriage 102 advances the 5 pushers 44 (see FIG. 7) sufficiently forwardly (in the direction of web movement) so as to engage the successive stacks with the conveyor 37—more particularly, the tapes 45 constituting the same.

Figure 10:
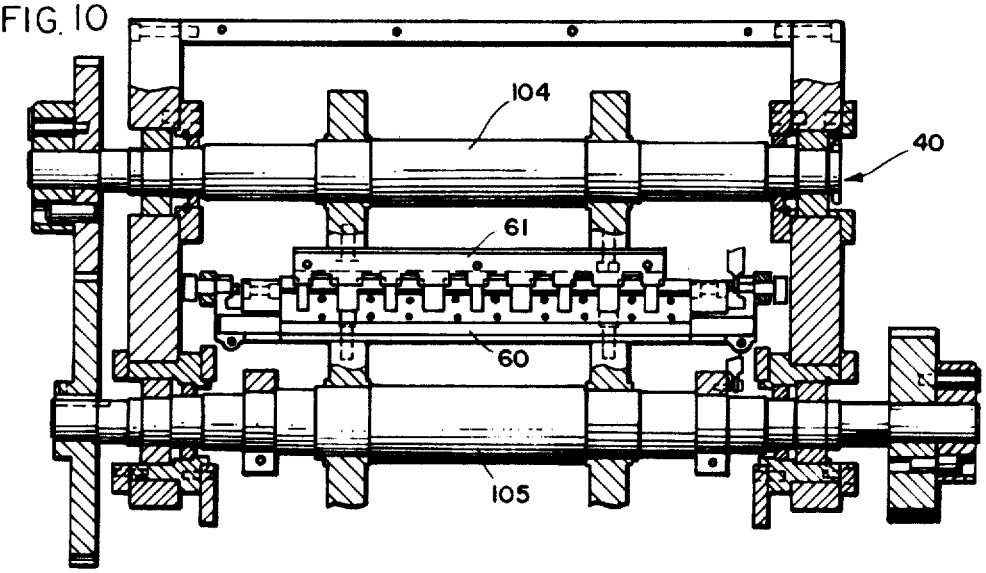
FIG. 10 is a front elevational view, partially in section, of the gripping device seen at the extreme upper portion of FIG. 4.

In FIG. 10 the gripping mechanism 40 of FIG. 4 is seen in front elevational view. A tucker element 61 is seen to be in interleaved relation with a gripper element 60, the tucker elements being mounted on a cross-shaft 104 while the gripper elements are mounted on a cross-shaft 105.

Figure 11:
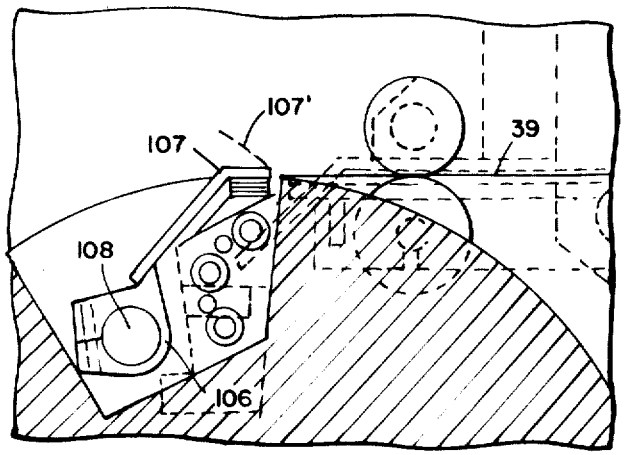
FIG. 11 is a side elevational view of a modified form of gripping device.

In certain instances, the modified form of gripper seen in FIG. 11 can be used to advantage. The gripper 106 as shown there is equipped with an element 107, and this eliminates the necessity of tucking the leading edge of the unit set 39 into the gripper of the inverting roll. The location of the pivot point 108 of the gripper 106 is such that the gripper, in opening, will move the element 107 forwardly on the circumference of the roll as well as radially outward—this being designated schematically in FIG. 11 by the numeral 107′. This allows the open gripper element to pass through the path of the unit set 39 forward of the leading edge of the unit set 39. After the gripper is through the path of the unit set, the gripper element 107 returns to the position shown, and closes on the leading edge by pivoting back on the circumference and radially downward.

Figure 12:
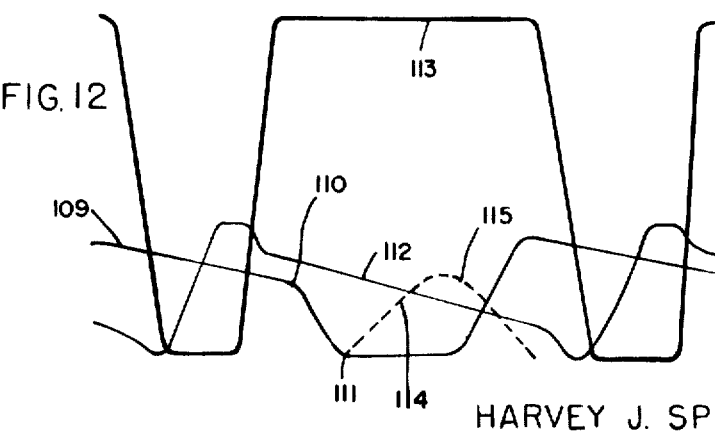
FIG. 12 is a chart showing the movement of the various fingers and pushers during the course of a stacking cycle.

In the operation of the device, a cycle can be considered to start during the downward movement of the elevator fingers 42. This can be appreciated from a consideration of FIG. 12 where the elevator finger movement is presented graphically and designated by the numeral 109. The elevator fingers 42 are lowered slowly during the retraction of the separator fingers 41 until the time in the cycle represented by the numeral 110 is reached, after which the elevator fingers drop rapidly. At point 111, the elevator fingers 42 are below the surface of the table fingers 43, at which time the pushers 44 remove the completed stack from the table fingers onto the conveyor 37. The curve designated by the numeral 112 in FIG. 12 represents the secondary motion of the separator fingers 41, i.e., the up and down motion, while the curve designated by the numeral 113 in FIG. 12 represents the primary motion of the separator fingers 41, i.e., the in and out movement relative to the path of stack formation.

During the period from point 111 on the curve 109 until the elevator fingers 42 start to raise (90°), the pushers 44 are stripping the stack onto the conveying table, this movement being indicated by the numeral 114. For the next 90°, the pushers 44 are being retracted, this being indicated at 115. The pushers 44 then remain at rest for 180°. It should be appreciated that the fingers 41 are tucked up into the inverting roll prior to their movement. This allows the fingers to move toward the stacking area, and to start pivoting downward prior to entering the stacking area. This allows the fingers to have a forward and downward velocity prior to the separation period. By entering the stacking area from the roll, the location of the unit set leading edge is assured during separation.

OPERATION

In the operation of the device, a "square," viz. unshingled, stack is achieved through the cooperation of the various elements in the device, particularly the pusher elements 44 which are arranged to remove a completed stack from the vertical path for deposition on the tapes 45. The cam 90, responsible for controlling the movement of the pusher elements 44, is so contoured as to horizontally move the pusher elements 44 at a speed somewhat greater than the horizontal speed of the tapes 45. This results in sequentially delivered stacks having a minimum spacing, thereby requiring a relatively small area of valuable floor space. Additionally, the pushers maintain the stack "square" during the crucial point of transfer by continually applying a distributed force against the trailing edges of the various superposed unit sets. Previously it was not possible to achieve the minimum spacing. The jogger usually employed to achieve a square stack prevented this. It was also not possible to apply a horizontal force distributed over a number of vertical lines, as is provided herein by the pusher elements 44.

Further, it is relatively simple to adjust the inventive apparatus so as to achieve proper interrelation or synchronism of the various moving parts. A reference has been made to "fine tuning" mechanisms which can be adjusted by an artisan in the field. The machine can be turned over slowly so as to gauge the interrelation, for example, of the separator fingers 41, the elevator fingers 42, and the pusher elements 44. These have been previously referred to as the slots 71 and 84 relative to the separator fingers 41, and the slot 100 relative to the pusher elements 44.

We claim:

1. Apparatus for delivering stacks of generally rectangular web units comprising a frame equipped with means for delivering objects to be stacked over a generally vertically disposed path, said frame being equipped with a generally horizontally extending conveyor and first and second stack-supporting elongated fingers in said path, means on said frame for reciprocating said first stack-supporting fingers in said path with the lowest point of reciprocation being below said conveyor whereby a stack is adapted to be transferred from said first stack-supporting fingers to said conveyor, said reciprocating means including cam means for maintaining said first stack-supporting fingers at the lowest point in said path for a predetermined time, means on said frame for orbiting said second stack-supporting fingers in a generally vertical plane so that the vertically downwardly portion of the orbit is in said path and so that said second stack-supporting fingers, when near the lowest point of said orbit portion, are below the first stack-supporting fingers whereby a partial stack is transferable from said second stack-supporting fingers to said first stack-supporting fingers and removal means for transferring a stack of units from said first stack-supporting fingers to said conveyor, said removal means including a plurality of stationary horizontally spaced apart elongated table fingers on said frame at the bottom of said path arranged to receive a unit stack from said first stack-supporting fingers, said first stack-supporting fingers and table fingers being mounted with their lengths in parallel offset relation whereby said first stack-supporting fingers are adapted to pass between said table fingers, in depositing a stack thereon a pusher mechanism on said frame equipped with a plurality of horizontally upstanding pusher elements spaced apart to pass between said table fingers and said first stack-supporting fingers to horizontally move a unit stack from said table fingers, and means on said frame synchronized with said means for reciprocating said first stack-supporting fingers for moving said pusher mechanism while said first stack-supporting fingers are maintained at said lowest point in said path, and said conveyor including tape means aligned with said table fingers for receiving stacks moved therefrom by said pusher mechanism.

2. Apparatus for delivering stacks of generally rectangular web units comprising a frame equipped with means for delivering objects to be stacked over a generally vertically disposed path, said frame being equipped with a generally horizontally extending conveyor and first and second stack-supporting fingers in said path, means on said frame for reciprocating said first stack-supporting fingers in said path with the lowest point of reciprocation being below said conveyor whereby a stack is adapted to be transferred from said first stack-supporting fingers to said conveyor, means on said frame for orbiting said second stack-supporting fingers in a generally vertical plane so that the vertically downwardly portion of the orbit is in said path and so that said second stack-supporting fingers, when near the lowest point of said orbit portion, are below the first stack-supporting fingers whereby a partial stack is transferable from said second stack-supporting fingers to said first stack-supporting finger, the improvement characterized by the fact that said apparatus includes removal means for transferring a stack of units from said first stack-supporting fingers to said conveyor, said removal means including a plurality of horizontally spaced apart fingers on said frame at the bottom of said path arranged to receive a unit stack from said first stack-supporting fingers as said first stack fingers pass between said table fingers, a pusher mechanism on said frame equipped with a plurality of upstanding pusher elements arranged to pass between said table fingers to horizontally move a unit stack from said table fingers, said means for orbiting said second stack-supporting fingers including two cams interconnected so that the second cam rotates faster than the first cam, power from said second cam being delivered to said second stack-supporting fingers, said cams being contoured so that said first cam serves as a lockout cam for said second cam.

UNITED STATES PATENT OFFICE
CERTIFICATE OF CORRECTION

Patent No. 3,599,805          Dated   August 17, 1971

Inventor(s)  Harvey J. Spencer and Ernst Daniel Nystrand

It is certified that error appears in the above-identified patent and that said Letters Patent are hereby corrected as shown below:

Column 7, line 2 (claim 2, line 21), before "fingers" insert

-- table --.

Signed and sealed this 4th day of January 1972.

(SEAL)
Attest:

EDWARD M. FLETCHER, JR.           ROBERT GOTTSCHALK
Attesting Officer                 Acting Commissioner of Patents